United States Patent [19]

Connor et al.

[11] 4,056,268
[45] Nov. 1, 1977

[54] APPARATUS FOR MOTORCYCLE POLO GAME

[76] Inventors: Thomas R. Connor; Shirley A. Connor, both of 5626 Putnam Drive, W. Bloomfield, Mich. 48033

[21] Appl. No.: 677,578

[22] Filed: Apr. 16, 1976

Related U.S. Application Data

[63] Continuation-in-part of Ser. No. 577,305, June 9, 1975, abandoned.

[51] Int. Cl.² ............... A63B 71/02; A63C 19/12; B60K 41/20; B62D 61/02
[52] U.S. Cl. ............... 273/118 R; 180/33 R; 180/77 HT; 272/3; 280/289 R
[58] Field of Search ............... 273/118, 85 R; 180/30, 180/33 R, 77 H, 77 HT; 280/289 R; 297/195; 272/3

[56] References Cited

U.S. PATENT DOCUMENTS

| | | | |
|---|---|---|---|
| 583,809 | 6/1897 | Libbey | 180/33 R |
| 616,153 | 12/1898 | Sperry | 180/77 HT UX |
| 2,330,341 | 9/1943 | Du Pont et al. | 297/195 X |
| 2,613,722 | 10/1952 | Ruppert | 297/195 |
| 3,820,790 | 6/1974 | Peterson | 273/118 R X |

OTHER PUBLICATIONS

Sports Illustrated, vol. 35, No. 3, July 19, 1971, pp. 20-22, 25.

*Primary Examiner*—Anton O. Oechsle
*Attorney, Agent, or Firm*—James B. Lake, Jr.

[57] ABSTRACT

A conventional motorcycle modified by a center lever steering control that is slidable in longitudinal extension and rotatable about the axis of slide at the extremities of slide but not therebetween, and is pivotable vertically around a pivotal connection to a center steering unit in place of conventional handlebars. Handlebar controls are attached for foot control. Resilient knee rolls are fixed to a gas tank above the knees of a rider to prevent slipping from motorcycle when rising from seating position to strike a ball. An upwardly extending hand loop fixed above a gas tank and knee rolls ensures that leaning outwardly does not change direction of travel by inadvertent movement of the steering control. Wider tires than in road riding and disc wheels are respectively recommended for improved traction and the abolition of chance of catching a mallet in a spoked wheel. A conventional playing field is modified by covering turf with a neoprene covered net, pivotally mounting side boards to swing flat and spring loading to return to vertical, and making goals of flexible material, all for preventing injury to players and apparatus.

5 Claims, 12 Drawing Figures

APPARATUS FOR MOTORCYCLE POLO GAME

BACKGROUND OF THE INVENTION

1. Field of the Invention.

This is a continuation-in-part of my original application for patent, Ser. No. 577,305 filed June 9, 1975 now co-pending and which is to be abandoned upon the filing of this specification.

The invention relates generally to the game of polo, and more particularly to apparatus for motorcycle polo game.

2. Description of the Prior Art.

Polo does not seem to have been played on motorcycles heretofore, but has been played on bicycles with no modification of the bicycle or field.

SUMMARY OF THE INVENTION

It is an object of the invention to provide steering apparatus that will not interfere with hitting a ball with a mallet from a motorcycle.

Another object of the invention is to provide foot control for all motor controls and braking.

Another object of the invention is to increase traction and decrease wear and tear on a playing field.

A further object of the invention is to provide apparatus for stabilizing a rider on a moving motorcycle as he rises from his seat and tries to hit a ball on the ground.

A last object of the invention is to provide side boards and goals on the field that are compatible with the use of motorcycles.

DETAILED DESCRIPTION OF THE INVENTION

Figure 1:
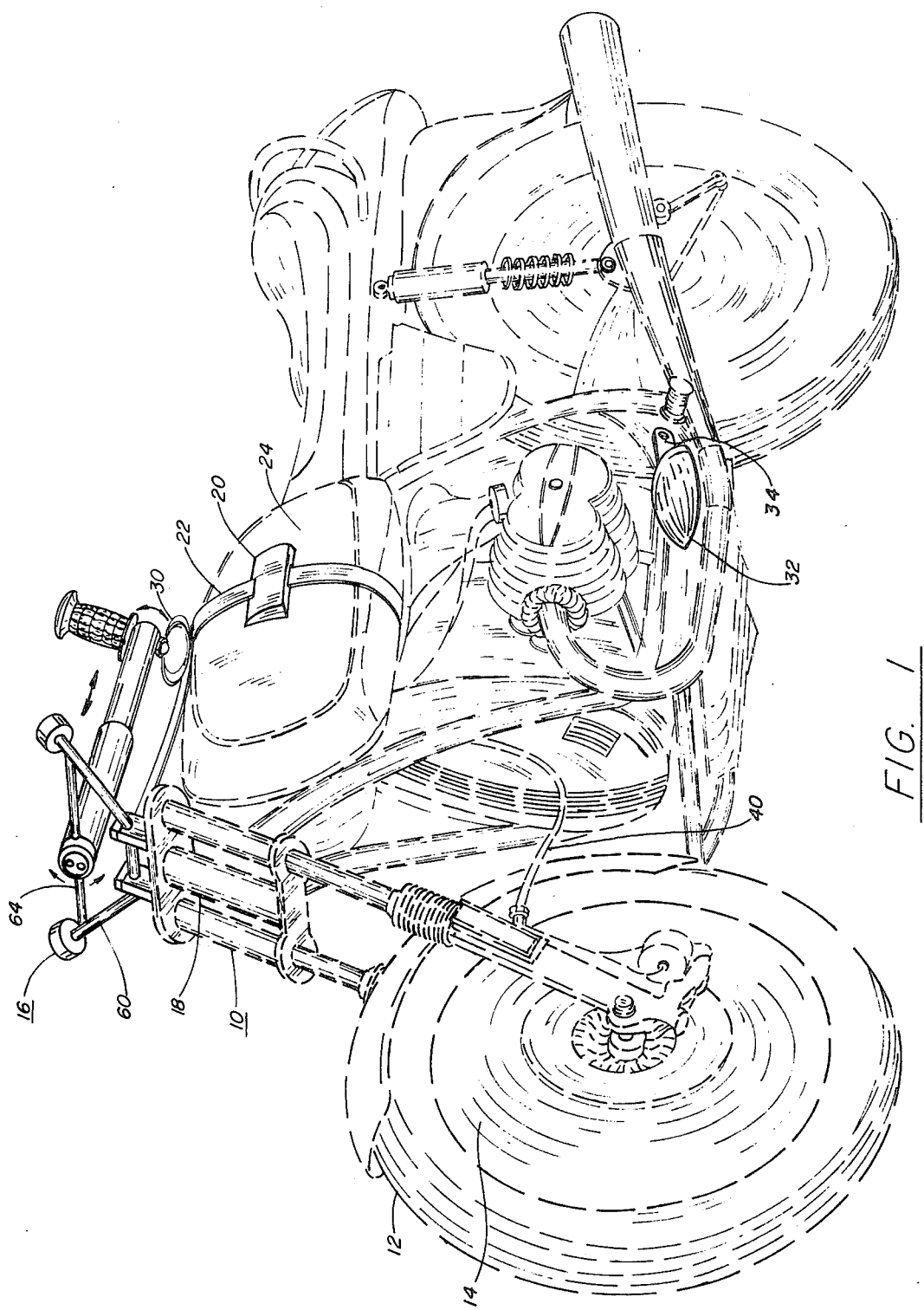
FIG. 1 is a three dimensional view of a motorcycle modified for playing polo.
Figure 4:
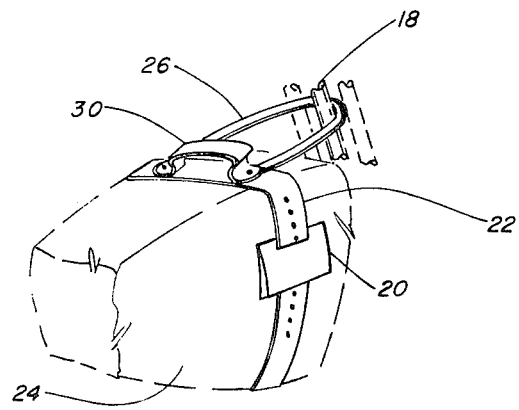
FIG. 4 is a partial three dimensional view of a motorcycle showing position and installation of stabilizing apparatus.
Figure 6:
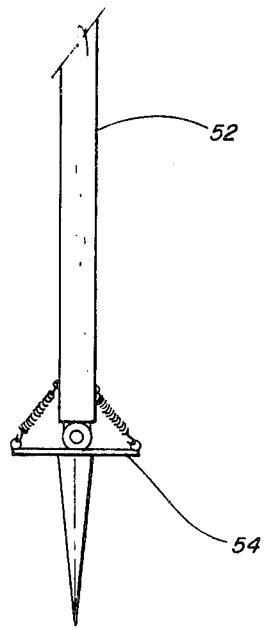
FIG. 6 is a side elevation of a field side board.
Figure 7:
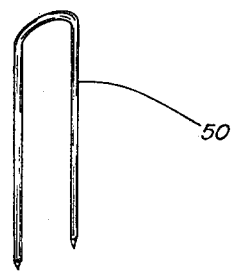
FIG. 7 is a three dimensional view of a net staple.
Figure 8:
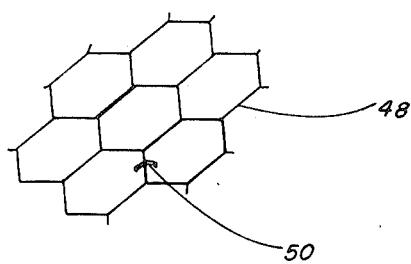
FIG. 8 is a partial view of netting and fastening.
Figure 5:
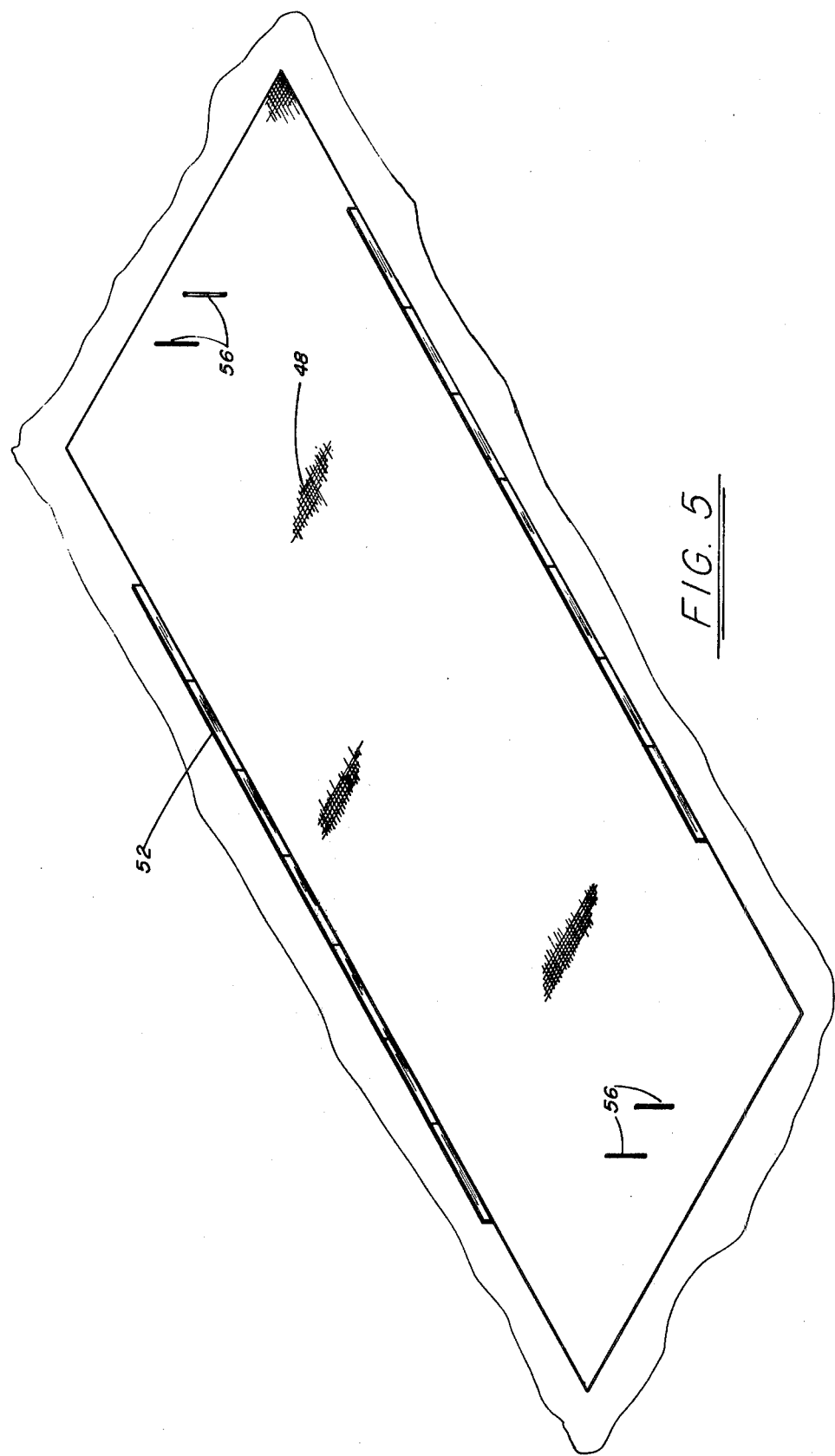
FIG. 5 is a three dimensional view from above of a playing field according to the invention.
Figure 9:
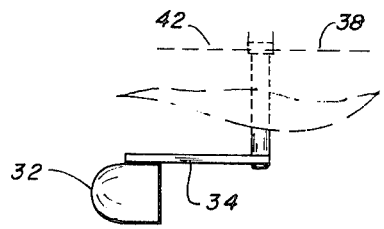
FIG. 9 is a plan view of the throttle and brake foot pedal.
Figure 10:
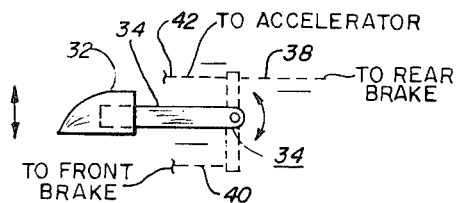
FIG. 10 is a side view of FIG. 9.
Figure 11:
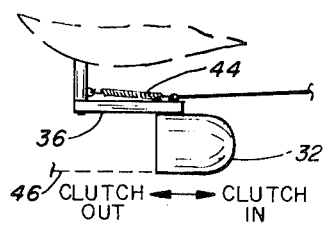
FIG. 11 is a plan view of clutch and gear shift pedal controls.
Figure 12:
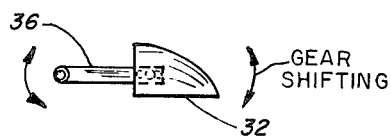
FIG. 12 is a side view of FIG. 11.

Referring to FIG. 1, the invention comprises a motorcycle 10 of any convenient make and size which is modified by installing wide anti-skid tires 12 on disc wheels 14 and removing the conventional handlebars (not shown) and replacing them with steering control 16 that is rigidly connected to a central steering post 18. Resilient knee rolls 20 are adjustably mounted to a circumferential strap 22 for securing around a top mounted gas tank 24, the rolls being adjusted adjacent the knees of a rider or player to permit him to lean forward and backward without fear of loosing his knee grip on motorcycle 10. A hand strap 26 secured to center steering post 18 at one of said strap ends and to strap 22 at the other of said ends defines a hand loop 30 at the strap 22 end for engaging with a steering hand gripping operably steering control 16 for preventing inadvertently changing direction of motorcycle 10 when leaning outward to strike a ball. See FIG. 4.

Conventional foot controls are modified by adding foot-cups 32 to pedal controls 34 and 36 of motorcycle 10. A foot-cup 32 is fixed to pedal control 34 to which brake cables 38 and 40 are operably connected for brake application when pedal control 34 is depressed, and throttle cable 42 is connected for increasing speed when pedal control 34 is raised. A second foot-cup 32 is slidably mounted on pedal control 36 and biased by spring 44 rearward. Second foot-cup 32 is connected with clutch cable 46 for disengaging the clutch when slid forward and engaging said clutch (not shown) when biased rearward. Raising and depressing pedal control 36 shifts gears. See FIGS. 9–12.

A polo playing field is modified by covering with a neoprene covered netting 48 that is secured to the field on three foot centers by staples 50. Side boards 52 running along the sides of the field are pivoted to anchoring extensions 54 and biased upright for deflecting a ball back in the field but allowing a motorcycle 10 to flatten it in either direction of pivoting when running into it. Goal posts 56 are made of an elastic material for yielding to impact with a motorcycle 10. The field modifications thus permit fast stops, starts and turns without destroying the turf and with increased traction between wide non-skid tires and the field, allows collisions with side boards without damage to motorcycle and rider, and the same with respect to goal posts. See FIGS. 5–8.

Figure 2:
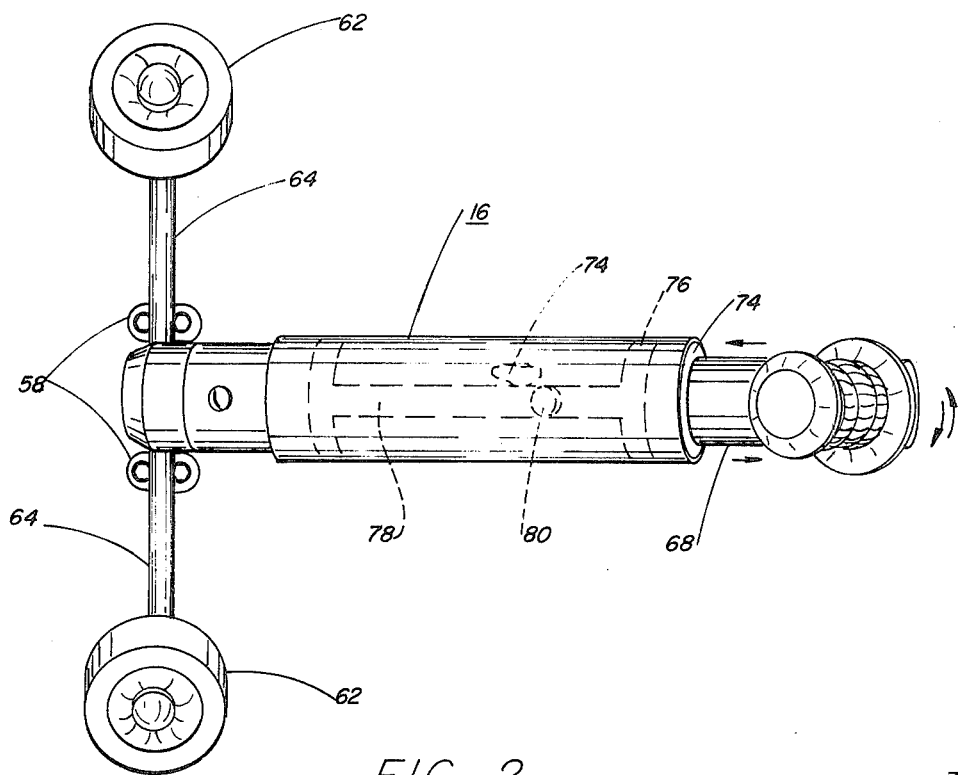
FIG. 2 is a plan view of steering apparatus of the invention with interior channels and engaging projection shown by dotted lines.
Figure 3:
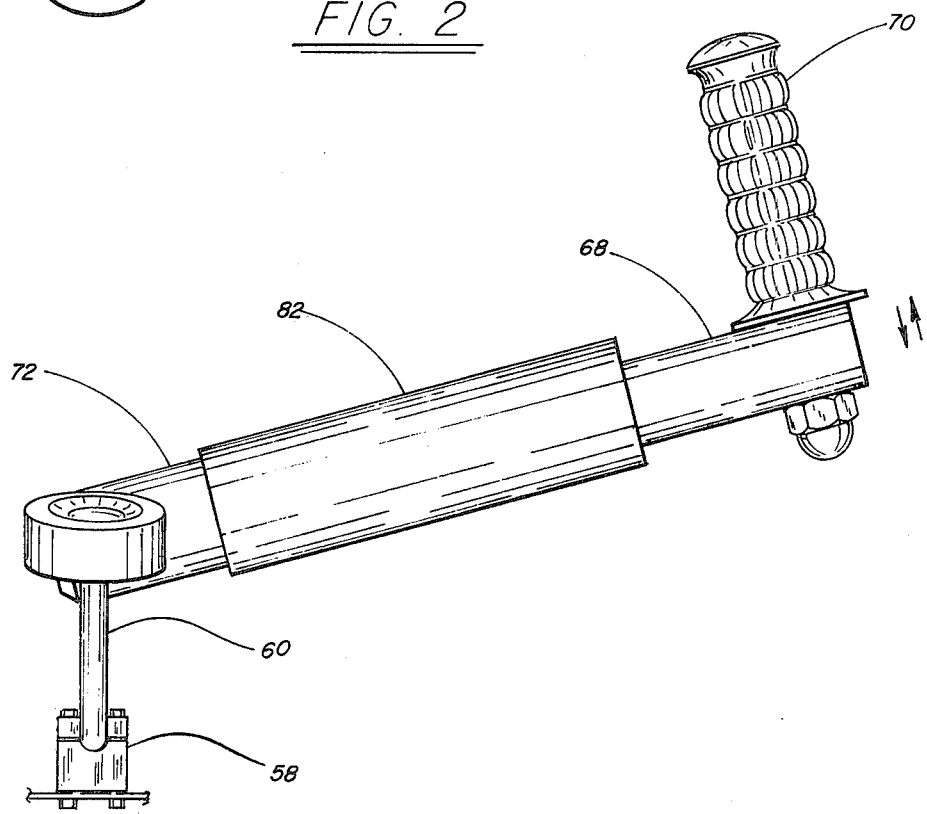
FIG. 3 is a side view of the steering apparatus illustrated in FIG. 2.

Referring to FIGS. 2 and 3, steering control 16 comprises clamps 58 rigidly clamping it to center steering post 18. Miniature handlebars 60 with hand knobs 62 are connected by transverse rod 64 serving as a pivot support for a rearwardly extending steering lever 68 on the end of which handgrip 70 is fixed. Handlebars 60 are provided to meet the minimum requirements for road use to get motorcycle 10 to and from a playing field under its own power.

Steering lever 68 comprises a deformable middle sleeve 72 pivoted at one end to transverse rod 64 equidistant from said hand knobs 62. Interior "I" channel 74 is defined in the top of middle sleeve 72 with the parallel end channel parts 76 defining semi-circles adjacent the oppositely disposed ends of middle sleeve 72. An inner member 78 having an upwardly projecting lug or cam 80 adapted to engage in "I" channel 74 is forced into middle sleeve 72 by deforming it sufficiently to admit lug or cam 80 past the free end of middle sleeve 72 and slidably engage said inner member 78 in said middle sleeve 72 with lug 80 engaged in "I" channel 74. A non-deformable outer sleeve 82 is fixed around deformable middle sleeve 72 to prevent any deformation that would allow the disengagement of lug 80 from channel 74. Handgrip 70 is mounted normal to inner member 78 and on its free end to extend upwardly.

What is claimed is:

1. Apparatus for motorcycle polo game comprising in combination:
   a. center lever steering means mounted on a motorcycle's steering post for steering with one hand;
   b. player stabilizer means fixed between a motorcycle's saddle and steering post for stabilizing player as he strikes at a ball;

c. feet operated control means operably connected to a motorcycle's motor and brakes for controlling said motorcycle's motion other than steering; and d. cooperating traction means mounted on a motorcycle and a playing field for increasing the traction therebetween without destroying the playing field surface.

2. Apparatus for motorcycle polo game as described in claim 1 wherein said center lever steering means comprises:

a. a round deformable outer sleeve having oppositely disposed ends and pivoted by one said end to the steering post and the said other free end extending rearward, said outer sleeve defining interior semi-circular channels adjacent said respective ends in the upper half thereof and connected by a straight channel bisecting said semi-circular channels;

b. a round inner member slidably mounted in said sleeve and having a projection extending normal therefrom adapted to engage in said semi-circular and straight channels for forward and rearward sliding in said sleeve with said projection engaged in said straight channel, and locked against said sliding when rotated to engage said projection in a semi-circular channel;

c. a rigid sleeve fixed to said outer deformable sleeve for preventing a release of said projection from said channels after the inserting thereof by deforming said deformable sleeve; and d. a handle fixed to said free end of said round inner member for moving it in extension, rotating it around an axis of said extension, and pivoting said outer sleeve in a vertical plane and said center lever steering means around said steering post.

3. Apparatus for motorcycle polo game as described in claim 1 wherein said stabilizer means comprise:

a. knee rolls adjustably fixed to a motorcycle gas tank above the knees of a player for preventing the slipping thereof as player reaches from side to side and rearward and forward to strike at a ball; and b. a hand loop fixed to a motorcycle gas tank above and between said knee rolls for engaging simultaneously with said central lever steering means by a steering hand of player to prevent a sidewise movement thereof to change direction of motorcycle when said player leans outward to strike a ball.

4. Apparatus for motorcycle polo game as described in claim 1 wherein said feet operated control means comprise:

a. a first foot-cup rigidly fixed to a motorcycle brake control pedal to which is connected a throttle control cable, said pedal control being adapted to being raised toward full throttle and depressed toward idling and an application of brakes; and b. a second foot-cup slidably mounted on a motorcycle gear shift pedal, said pedal being adapted to shift gears by raising and depressing and to engage and disengage a clutch by being biased rearwardly or slid forwardly respectively.

5. Apparatus for motorcycle polo game as described in claim 1 wherein said cooperating traction means comprise;

a. over-sized non-skid tires mounted on said motorcycle for increasing engaged surfaces of tire and field; and b. plastic covered netting stapled to said playing field on three foot centers, said plastic covering and oversized non-skid tires having a high coefficient of friction in engagement, said netting also for preventing destruction of said playing field surface.

* * * * *